(12) United States Patent
Ferreira et al.

(10) Patent No.: US 7,861,544 B2
(45) Date of Patent: Jan. 4, 2011

(54) APPARATUS AND METHODS FOR CREATING SPARKLING WATER FROM THE ATMOSPHERE

(75) Inventors: Wayne Ferreira, La Fayette, CA (US); Henri-James Tieleman, Miami, FL (US)

(73) Assignee: EcoloBlue, Inc., Miami, FL (US)

( * ) Notice: Subject to any disclaimer, the term of this patent is extended or adjusted under 35 U.S.C. 154(b) by 0 days.

(21) Appl. No.: 12/747,902

(22) PCT Filed: Oct. 23, 2009

(86) PCT No.: PCT/US2009/061811

§ 371 (c)(1), (2), (4) Date: Jun. 14, 2010

(87) PCT Pub. No.: WO2010/056486

PCT Pub. Date: May 20, 2010

(65) Prior Publication Data

US 2010/0266742 A1 Oct. 21, 2010

Related U.S. Application Data

(60) Provisional application No. 61/115,534, filed on Nov. 17, 2008.

(51) Int. Cl.
*F25D 21/00* (2006.01)
*A23L 2/00* (2006.01)

(52) U.S. Cl. .............................. 62/150; 62/272; 62/389; 426/67

(58) Field of Classification Search ............. 62/92, 62/150, 272, 285, 389; 426/66, 67; 222/146.6
See application file for complete search history.

(56) References Cited

U.S. PATENT DOCUMENTS

| | | | | |
|---|---|---|---|---|
| 6,182,453 | B1 * | 2/2001 | Forsberg | 62/125 |
| 6,343,479 | B1 * | 2/2002 | Merritt | 62/285 |
| 6,644,060 | B1 * | 11/2003 | Dagan | 62/285 |
| 6,993,928 | B2 * | 2/2006 | Akkad | 62/291 |
| 7,373,787 | B2 * | 5/2008 | Forsberg et al. | 62/285 |
| 7,540,167 | B2 * | 6/2009 | Murphy et al. | 62/285 |

(Continued)

FOREIGN PATENT DOCUMENTS

| | | |
|---|---|---|
| WO | 2006-049387 A1 | 5/2006 |
| WO | 2008-056223 A1 | 5/2008 |

OTHER PUBLICATIONS

International Search Report in PCT/US2009/061811 dated Jun. 7, 2010.
Written Opinion in PCT/US2009/061811 dated Jun. 7, 2010.

*Primary Examiner*—Marc E Norman
(74) *Attorney, Agent, or Firm*—Oppedahl Patent Law Firm LLC

(57) ABSTRACT

What is disclosed is a system designed to extract water moisture from the atmosphere, highly purify and condition the extracted water, and provide optional carbonation of the extracted water for human consumption. In one embodiment, the device collects water-vapor condensation from filtered intake air, then subjects the condensate to a series of purification filters and to a sterilization process in order to produce drinking water, while also providing a means to combine the purified water with $CO_2$ gas to facilitate dispensing carbonated water and/or carbonated drinks.

14 Claims, 5 Drawing Sheets

U.S. PATENT DOCUMENTS

| | | |
|---|---|---|
| 7,726,138 B2 * | 6/2010 | Bailey .......................... 62/93 |
| 2003/0159457 A1 | 8/2003 | Abdul-Rahman |
| 2004/0040322 A1 | 3/2004 | Engel |
| 2007/0017234 A1 * | 1/2007 | Moulder et al. ................ 62/66 |
| 2007/0175234 A1 | 8/2007 | Pruitt |
| 2009/0211275 A1 * | 8/2009 | Castanon Seoane ............ 62/93 |

* cited by examiner

APPARATUS AND METHODS FOR CREATING SPARKLING WATER FROM THE ATMOSPHERE

CROSS-REFERENCE TO RELATED APPLICATIONS

This application claims the benefit of U.S. patent application No. 61/115,534, filed Nov. 17, 2008, which application is incorporated herein by reference for all purposes.

BACKGROUND OF THE INVENTION

The demand by consumers for good-tasting, pure and safe, economical, and environmentally friendly sources of drinking water has resulted in an ever-growing market for purified bottled water, including water packaged in individual-sized plastic bottles and dedicated water coolers that requires periodic delivery and change-out of large water bottles. Not only is either of the preceding water-delivery methods in efficient and relatively expensive, but they each expend precious water-supply resources. Moreover, individual purified-water bottles are usually made of plastic and are rarely recycled, which results in undesirable solid waste to populate landfills.

One source of water that often goes unappreciated and generally uncapitalized on is the humidity in the atmosphere. While the prior art has long included room dehumidifiers, which condenses humidity in the air and produces waste water to be later dumped, these dehumidifiers do not subject the condensate to specialized filtration or other processing to make the water suitable and/or better tasting for human consumption.

In addition, many consumers enjoy bottled soda water, the delivery of which presents the same problems as was discussed for non-carbonated purified water bottles already discussed above. Therefore, it would be desirable to create a convenient, economical, and environmentally friendly means to deliver safe, pure, good-tasting carbonated water for human consumption either by itself or in combination with other flavorings and substances.

BRIEF SUMMARY OF THE INVENTION

The inventive disclosures contained herein include a system designed to extract water moisture from the atmosphere, highly purify and condition the extracted water, and provide optional carbonation of the extracted water for human consumption. In one embodiment, the device collects water-vapor condensation from filtered intake air, then subjects the condensate to a series of purification filters and to a sterilization process in order to produce drinking water, while also providing a means to combine the purified water with $CO_2$ gas to facilitate dispensing carbonated water and/or carbonated drinks. This highly purified carbonated water is also conducive to the health of consumers.

In some alternative embodiments, where there is very low humidity and/or ambient temperature, which said environment is not conducive to the production of very much condensate for water production, the device can be connected directly to an external tap-water source, wherein the tap water is subjected to the device's purification filtration and sterilization processes, as well as the optional carbonation process.

The preceding summary is only intended to provide a very brief overview of the inventive disclosures contained within this patent application. The preceding brief summary is not intended to recite the entirety of the inventive concepts disclosed herein.

DETAILED DESCRIPTION

One embodiment includes a system designed to extract water moisture from the atmosphere, highly purify and condition the extracted water, and provide and optional carbonation of the extracted water for human consumption. The device collects water-vapor condensation from filtered intake air, then subjects the condensate to a series of purification filters and to a sterilization process in order to produce drinking water, while also providing a means to combine the purified water with $CO_2$ gas to facilitate dispensing carbonated water and/or carbonated drinks.

Alternatively, where there is very low humidity and/or low ambient temperature, which said environment is not conducive to the production of very much condensate for water production, the device can be connected directly to an external tap-water source, wherein the tap water is subjected to the device's purification filtration and sterilization processes, as well as the optional carbonation process.

Figure 1:
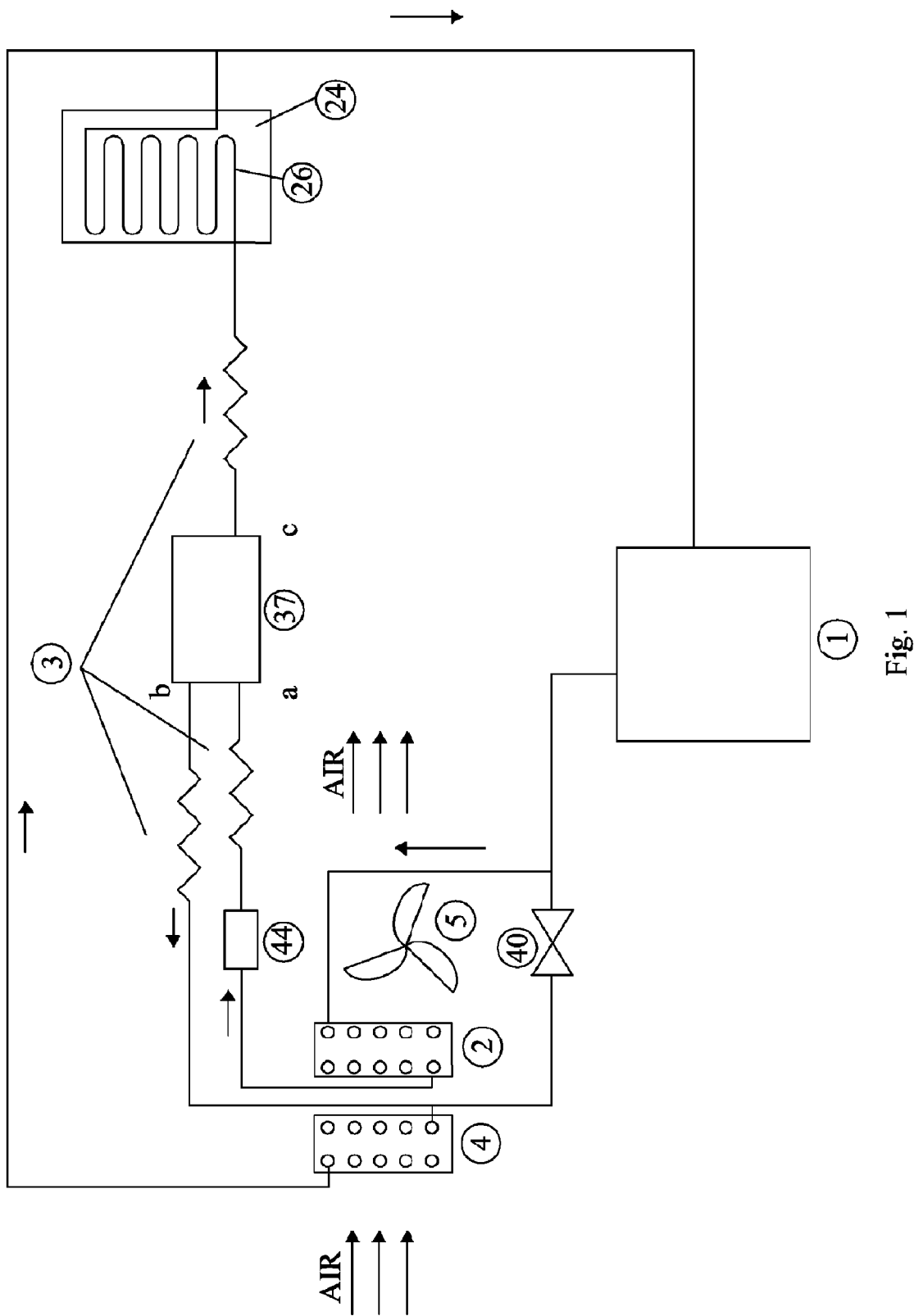
FIG. 1 depicts a simplified one-line diagram of one embodiment of the refrigeration system that extracts water from the atmosphere, which shows the fluid flow through major components.
Figure 2:
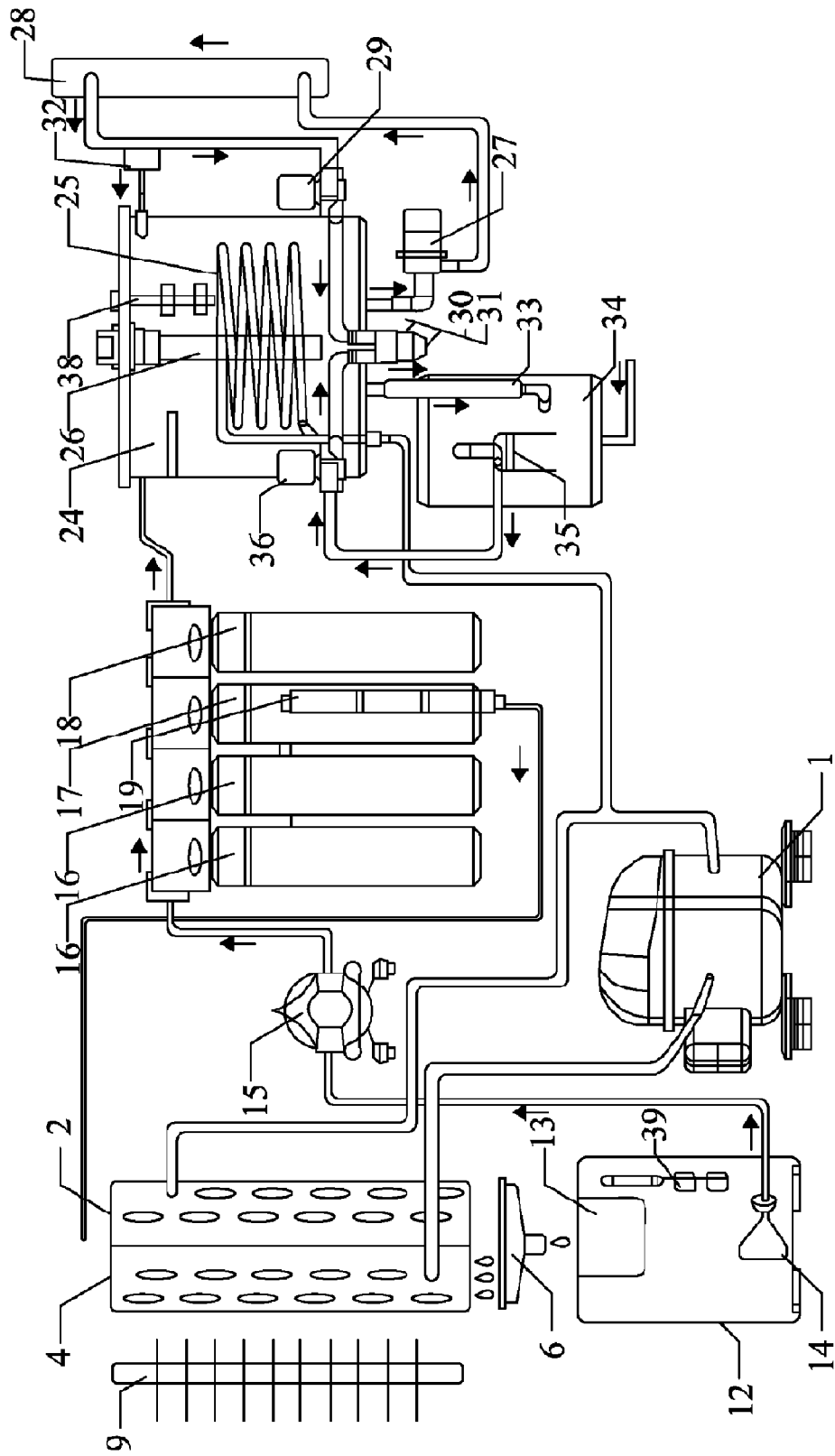
FIG. 2 shows a diagram of one embodiment of the system that extracts water from the atmosphere, depicting the functional relationships of major components that process the gas and liquids through filtration and sterilization to produce purified water.
Figure 3:
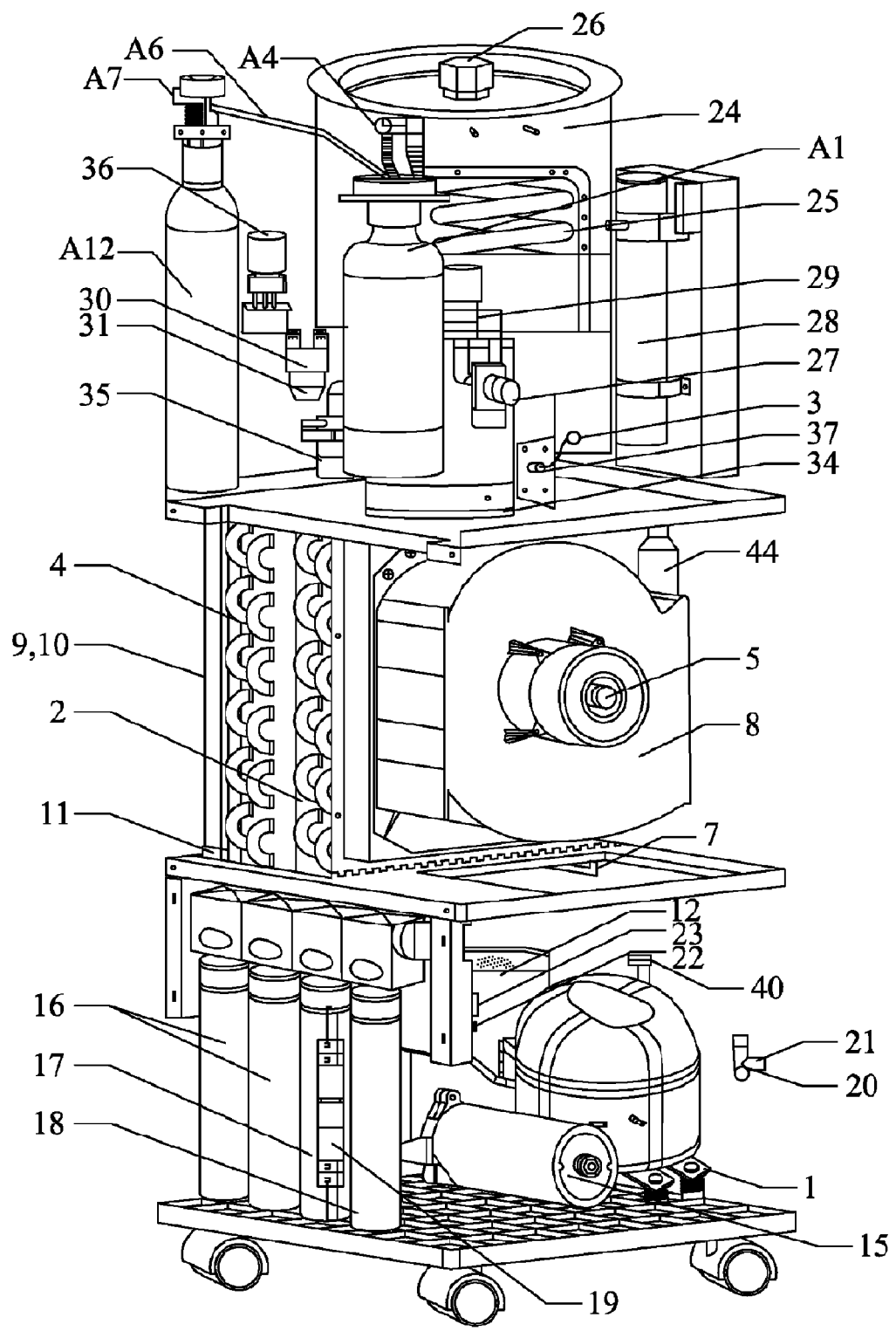
FIG. 3 depicts one embodiment of the inventive disclosure as an isometric view of major internal components.
Figure 4:
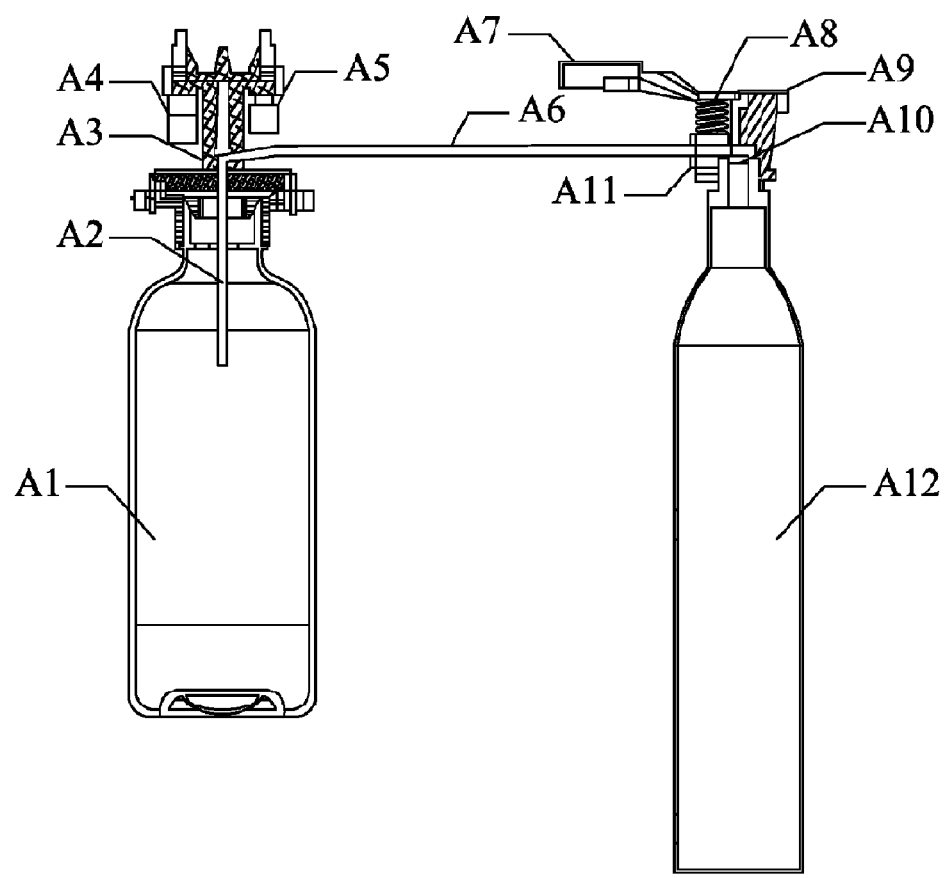
FIG. 4 depicts a $CO_2$ gas cylinder and the gas-diffusion chamber.
Figure 5:
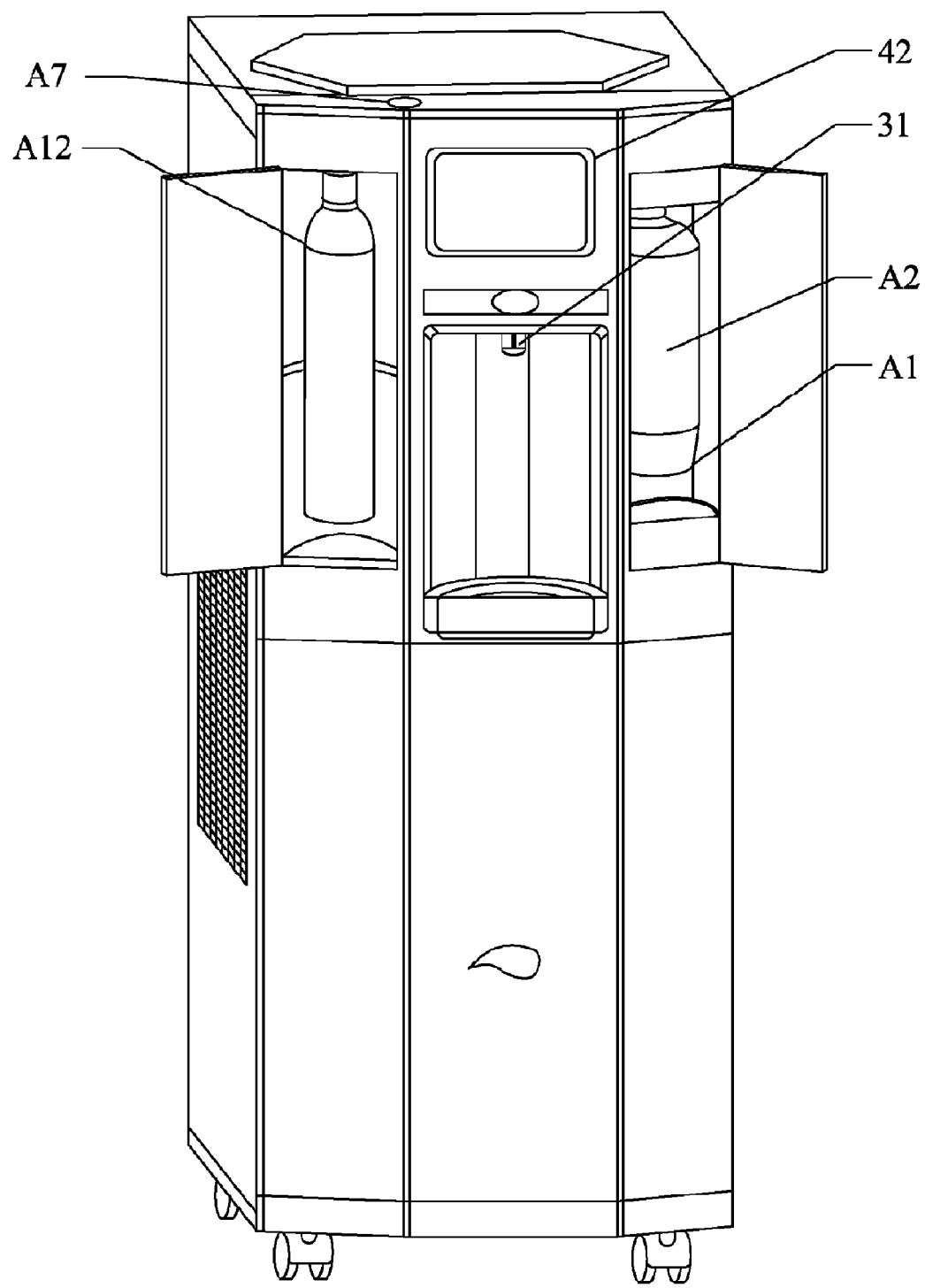
FIG. 5 depicts the front panels of one embodiment of the inventive disclosure, including the locations of a $CO_2$ gas cylinder and the gas-diffusion chamber.

Refer to FIGS. 1-5. Some embodiments incorporate the fan/blower-powered [5] intake of filtered air [9], which is directed through an evaporator-condensation means [4, 2], such as an aluminum-fin evaporator, causing condensate to gravity-drain into a collector means [6]. In one embodiment, the collector means [6] is a highly polished, plate-shaped, detachable water retainer, wherein the highly polished surface facilitates the gravity flow of condensate water into the lower water tank [12]. The collected water condensate is then pumped [15] through a series of filters (such as activated carbon filters, zeolite filters, and/or far-infrared filters mineralization) [16, 18] and through a reverse-osmosis filter [17]. The reverse-osmosis filter [17] is also connected to a waste-water proportion controller [19] that allows a user to control how much waste water the user would like the system to produce. The waste-water proportion controller [19] is connected to the collector means [6] and waste-water outlet via a three-way valve [20].

In an embodiment, the filtered water is then subjected to ultra-violet-light sterilization [26, 28] and temperature condition (cooling [25] or heating [35]). Finally, the device provides the user with the option of directing the purified water and $CO_2$ gas [A12] into a gas-water-diffusion chamber [A1], which then can provide the user with the purified, sparking water from the output [31]. Some embodiments also incorporate both a heating means [34, 35, 36] and a refrigeration means [1, 25, 37] so that end users can opt to dispense either heated water or cooled water. Some embodiments only provide a means to dispense cooled water, while even other embodiments dispense the water at ambient temperature.

In some embodiments, the various subsystems such as the heating and cooling systems, the sterilization system, and defrosting systems are controlled by an intelligent, single-chip control system. The single-chip control system uses inputs associated with water temperature, water level [38], and defrosting temperature to decide when to actuate various control devices, such as the solenoid cooling valve [37].

In some embodiments, the refrigeration systems comprise a typical refrigeration cycle, including refrigerant compressed by a compressor [1] into a liquid, whereby the compressed refrigerant passes through the capillary aluminum-fin (or equivalent) condenser [2] and is vaporized, thus removing heat from the medium surround the evaporator. Notably, in some embodiments, a common compressor is used to supply refrigerant to both the evaporator-condenser [4, 2] and to the cooling coils [25] in the upper water tank [24], which is advantageous to both reduce the internal room required to house components and to conserve resources. One or more solenoid-operated control valves are used to direct refrigerant flow.

In an embodiment, the condensate-collection system comprises a condenser fan [5] with a collector [6], wherein the fan forces intake ambient air through the cold evaporator fins [4], on which liquid water will condense from the air and deposit on said fins, then gravity-drain into the collector [6] and into the lower water tank [12].

In an embodiment, the compressor [1] sucks-in gaseous refrigerant from evaporator [4] or from the cooling loop [25]. The compressed, hot refrigerant usually passes through condenser [2], and from there to restriction (copper filter) [44]. The refrigerant then passes through solenoid cooling valve [37]. If solenoid cooling valve [37] is not electrically energized, then the refrigerant passes through outlet [b] (see FIG. 1) and from there to the evaporator [4], where the refrigerant is permitted to expand and thus chills air passing through the evaporator [4]. If solenoid cooling valve [37] is electrically energized, the refrigerant passes through outlet [c] and from there to cooling loop [25] (contained within upper water tank [24]), where the refrigerant is permitted to expand and thus chills water in upper water tank [24].

In one embodiment, the compressor [1] is a high-efficiency, variable-speed compressor whose operation, including energizing times and speed, are controlled by a an inverter-controller. Preferably, the high-efficiency, variable-speed compressor (with controller) has characteristics comparable to those of a Panasonic® Model 6TD075XAA41. Because the compressor [1] is the largest electrical load on the system (typically, it represents almost 50% of the energy consumption of the system to generate water from the atmosphere), it is advantageous to minimize its cycling operations as allowed by ambient conditions, such as temperature and humidity. Moreover, the employment of such a controllable, high-efficiency compressor [1] facilitates the use of a solar-energy source such that the machine can be stationed remotely and independently from any external power source. In a related embodiment, the system is electrically powered by one or more solar panels rated at rated for at least 300 W.

In another embodiment, the intake ambient air previously mentioned leaves the evaporator [4] and passes through the condenser [2], which is hot, and the air absorbs heat from the condenser [2]. In another embodiment, the compressor [1] can pump hot refrigerant into the evaporator [4] in order to defrost the evaporator fins [4], using a defrost sensor (omitted for clarity in the figures) that senses a frost temperature in the evaporator [4]. If a excessive-frost condition arises, then solenoid-operated control valve [40] is opened, and hot refrigerant is ported directly into the evaporator [4] to defrost the evaporator [4]

In one embodiment, the lower water tank [12] is of a detachable design located in a drawer to facilitate easy cleaning and maintenance. In another embodiment, the lower water tank [12] also comprises a preliminary filter [13] (which in some embodiments is comprised of activated carbon or zeolite, to remove the smell of condensate water and ammonia). In another embodiment, the lower water tank also comprises a particle filter [14], which is used to help protect the one or more water pumps [15].

In an embodiment, to prevent secondary pollution from Pseudomonas resulting from evaporation at the brass fins due to pinna heat and water contact, and at the same time prevent corrosion at the evaporator [4], the evaporator [4] surface is coated with non-toxic, anti-corrosion materials that comply with applicable food standards for paint or a PTFE protective layer. This helps avoid the condensation of heavy metals into the water, which improves the safety of drinking water. Moreover, the coating promotes the rapid collection of water.

In an embodiment, in order to prevent large particulate matter and dust into the lower water tank [12], and at the same time to prevent mold on the evaporator [4] surfaces, the air intake is equipped with an anti-static, anti-mold air filter [9, 10]. Said air filters are installed in the air filter guide [11], providing convenient access for cleaning or changing-out.

In one embodiment, the water pump [15] pumps water through the activated carbon filters [16], the reverse-osmosis filter [17], and the zeolite filter [18]. The reverse-osmosis membrane filter [17] has an aperture of approximately $\leq 0.0001$ μm in order to filter out bacteria, viruses, and heavy metals, as well as to remove unwanted smells. This filtration helps ensure that the output water, whether be sparking water or non-sparkling water, meets applicable standards for drinkability. Wastewater output port [19] is employed in a backwash of the reverse-osmosis filter [17]. Filtered water, suitable for drinking, reaches the upper tank [24], where it can be chilled.

In another embodiment, the lower-water tank [12] has a water level sensor [39]. Whenever the water level sensor [39] detects that the tank [12] is substantially full, according to a predefined setpoint, then the evaporator [4] is not chilled by way of manipulation of the one or more solenoid-operated control valves [40], since the addition of more condensate to the tank [12] would risk overfilling the tank [12].

In an embodiment, each tank water-level sensor [38, 39] can adopt a design that includes a two-line water level sensor with a built-in magnet float, which can detect water level in different locations with a closure of a different reed switch to determine the value of the water level.

In an embodiment, the cooling loop [25] is used to control the water temperature in the upper water tank [24] to within the range of 2-15° C., which helps inhibit bacterial growth and reproduction. At the same time, in another embodiment, the upper water tank [24] is equipped with ultra-violet disinfection device [26, 28] to aid in water sterilization, which subjects the water within the upper water tank [24] to ultraviolet light. In one embodiment, the ultra-violet sterilization device [26, 28] has an effective sterilization rate of at least 99.99%, using a 254 nm wavelength. In an embodiment, the ultra-violet sterilization device [26] is controlled by the single-chip control system to periodically turn on as water within the upper water tank [24] is circulated by pump [27] through the sterilization chamber [28] and delivered back to upper water tank [24] in order to perform sterilization from time to time and to prevent bio-film growth in the tubing/piping.

In another embodiment, potable water is released through output filter [30] to outlet valve [31] by electrically operated valve [29], after having passed through the sterilization chamber [28].

In an embodiment, to supply hot water, water is able to drain through line [33] from upper water tank [24] into hot water tank [34], which contains an electrical heating element. Hot, potable water is pumped by water pump [35] through an electrically operated valve [36], and through output filter [30] to outlet valve [31] via electrically operated valve [29].

In one embodiment, another ultra-violet disinfection device is used for the user-selected output water stream (that is, hot or cold, sparking or non-sparkling, water) through outlet valve [31].

In an embodiment, the upper water tank [24] has water-level sensor [38]. Whenever the water-level sensor [38] detects that the upper water tank [24] is substantially full, according to a predetermined setpoint, then the water pump [15] is not operated, as this would overfill the upper water tank [24].

In an embodiment, the bank of carbon filters are configured such that they are easily accessible in the device to facilitate replacement.

In one embodiment, the water-heating tank [34] and supporting one-way valve [36] and water pump [35] are used to provide hot water within a range of 50-95° C., as controlled by the single-chip controller.

In another embodiment, the device employs a water-leakage-detection switch, which will shutdown the system if leakage within the device cabinet is detected.

In an embodiment, a user controls the device's mode of operation by way of a digital display and control system [42], which can employ either a button or touch-screen input device. Said system provides a means for a user to set the operating temperatures for the cooling and heating of the water to be output, as well as defrosting cycles. Additionally, said system provides a means for the end-user to select whether the output water is to be carbonated or not. In addition, the display provides notifications to the end-user of when filter replacements are due/recommended, the activation of the sterilization process, the upper and lower limit of the working humidity. Said system can also be programmed to save energy and shutdown key components, such as the compressor [1], when low-humidity and/or low-temperature conditions are detected. Finally, the display also provides troubleshooting information in the event of a system failure.

In another embodiment, the device can be connected to an external potable water source, which is advantageous for times when either the atmospheric conditions are such that there is low temperature and/or low humidity. In this case, the external water source can still take advantage of the device's onboard systems for high filtration, sterilization, temperature conditioning, and diffusion with $CO_2$ gas for the formation of sparkling water.

In an embodiment, the $CO_2$ gas is mixed with output water to produce carbonated drinks, through the installation of one or more $CO_2$ gas cylinders [A12] and a gas-diffusion chamber [A1], which are connected at their tops via a gas line [A6]. The $CO_2$ gas cylinder(s) [A12] is(are) equipped with a one-way valve [A10], having a valve stem [A9], and a pressure-relief valve [A11]. The $CO_2$ gas enters the gas-diffusion chamber [A1] via a one-way valve [A10] and the trachea [A2]. The gas-diffusion chamber [A1] is equipped with an inlet valve [A3] and a pressure-relief valve [A5]. An alarm is set off if the relief-valve [A5] spring pressure setting is set too high. Lever [A7] is urged upwards by spring [A8]. If a user causes lever [A7] to be depressed, then the valve stem [A9] is pushed downward, releasing gas into gas line [A6]. From there, the gas passes through throat [A2] into water contained in the gas-diffusion chamber [A1]. Eventually, release valve [A4] opens (the user will also hear the sound of filling as the gas-diffusion chamber realizes a saturated content of purified water and $CO_2$ gas), signaling to the user to release lever [A7]. Thus, in one embodiment, a user may unscrew the gas-diffusion chamber [A1], position the chamber under outlet valve [31], may dispense potable water into the gas-diffusion chamber [A1], screw the gas-diffusion chamber [A1] back into place, and then depress lever [A7] until signaled to release lever [A7] by a sound at release valve [A4]. In some embodiments, a user can get the output purified carbonated water via a separate output valve at the top of the gas-diffusion chamber [A1]. In other embodiments, a user can cause a solenoid control valve (via control panel [42]) to align the source of the output from valve [31] to be directed from the gas-diffusion chamber [A1].

In other embodiments, the gas-diffusion chamber [A1] is configured to receive purified water from the machine directly while in a depressurized state without direct user intervention, wherein a solenoid-operated control valve allows purified water to enter the gas-diffusion chamber [A1] until a predetermined level is reached. Said predetermined level can be detected by way of a water-level detector, such as one of a magnetic-float type as described earlier in this specification, or a pressure sensor. The gas-diffusion chamber [A1] is then able to be pressurized to a predetermined amount with $CO_2$ gas from $CO_2$ gas cylinder(s) [A12]. Said predetermined amount of pressurization, which in turn translates to the level of carbonation (saturation) of the water, can be detected and controlled by way of a pressure sensor or a water-level (expansion) detector within the gas-diffusion chamber [A1]. Then, the output of the machine can provide a purified sparkling-water output via throat [A2] and output valve [31].

When first used, the $CO_2$ gas cylinder(s) [A12] tightens up on the valve seat, resulting in no leakage. Additionally, the gas-diffusion chamber [A1] once primed with the purified water-and-$CO_2$ mixture also tightens up on its seals to prevent leakage.

In alternative embodiments, flavorings, including but not limited to fruit juices, can be added to the gas-diffusion chamber [A1] in addition to the purified water, thus resulting in potable, flavored carbonated drinks.

Potential Obvious Variations and Improvements

Those skilled in the art will have no difficulty devising myriad obvious variations and improvements to the invention, all of which are intended to be encompassed within the scope of the claims which follow.

The invention claimed is:

1. A system for providing drinkable sparkling water created from purified potable water derived from the atmosphere and infused with $CO_2$ gas, said system comprising:
   a housing having an air-inlet port and an air-exhaust port;
   a refrigerant compressor;
   at least one multi-way solenoid-operated refrigerant control valve;
   a controller means for monitoring for controlling said at least one solenoid-operated refrigerant control valve and other electrical subsystems within the system;
   an evaporator means, wherein said evaporator means has fins for maximizing surface-area contact and heat transfer with ambient air,
wherein said fins are coated with non-toxic, anti-corrosion materials that comply with applicable regulatory food standards for paint or a PTFE protective layer, said coating also promoting the rapid collection of condensate water, and
wherein said evaporator can be configured by said at least one solenoid-operated refrigerant control valve to receive chilled refrigerant as pumped from said refrigerant compressor to chill air passing across said evaporator fins, and
wherein said evaporator can be configured by said at least one solenoid-operated refrigerant control valve to receive hot refrigerant as pumped from said refrigerant compressor to defrost said evaporator fins;
an anti-static, anti-mold air filter,
wherein said anti-static, anti-mold air filter is installed upstream of said evaporator means;
a condenser means for the system's refrigeration cycle;
a fan/blower means,
wherein said fan or blower means circulates ambient air from said air-inlet port, through said anti-static, anti-mold air filter, across said evaporator means, said condenser means, then out said air-exhaust port;
a collector means with highly polished surfaces;
a preliminary filter to remove the smell of condensate water and ammonia,
wherein said preliminary filter is comprised of activated carbon or zeolite;
a condensate-collection tank,
wherein said highly polished surfaces of said collector means facilitate the gravity flow of condensate water into said condensate-collection tank, and
wherein said condensate-collection tank is equipped with a water-level detector, said water-level detector and controller means causing said evaporator means to stop receiving chilled refrigerant at a predetermined high-level setpoint;
at least one water pump;
a particle filter for filtering particles to protect the intake of said at least one water pump;
a water-purification filtration assembly to filter out bacteria, viruses, and heavy metals, as well as to remove unwanted smells, comprising:
at least one activated carbon filter,
at least one reverse-osmosis filter,
wherein said reverse-osmosis filter has an aperture of less than or equal to 0.0001 μm, and
wherein said reverse-osmosis filter can be back-flushed such that the waste water can be directed to said collector means via a three-way valve that is controlled by a waste-water proportion controller,
at least one zeolite filter;
wherein said water pump pumps condensate water from said condensate-collection tank through said water-purification assembly;
a purified-water-collection tank for collecting purified water,
wherein said purified-water collection tank is equipped with a water-level detector, said water-level detector and controller means causing said at least one water pump to stop pumping new purified water into said purified-water tank at a predetermined high-level setpoint;
a cooling loop disposed within said purified-water-collection tank,
wherein said cooling loop can be configured by said at least one solenoid-operated refrigerant control valve receive refrigerant as pumped from said refrigerant compressor to cool said purified water, and
wherein the temperature of said purified water in the purified-water-collection tank is maintained within a temperature range of 2-15° C.;
a sterilization means for killing biological material and viruses within said purified-water-collection tank, comprising an ultra-violet light device and sterilization chamber, said ultra-violet light device having an effective sterilization rate of at least 99.99%, using a wavelength in the range of 253-255 nm;
a hot-water tank that receives purified water from said purified-water tank through gravity drain,
wherein said hot-water tank contains an electrical heating element,
wherein the water within said hot-water tank is within a range of 50-95° C., as controlled by said controller means, and
wherein to provide hot, potable water for a user, said hot, potable water can be pumped by a hot-water pump through an electrically operated valve and an output filter to a common outlet header;
a common outlet valve, disposed at said common outlet header, that can be positioned to allow a user to obtain an output of hot or cold purified water from the system;
at least one $CO_2$ gas cylinder, stored within said housing and removable, equipped with a one-way valve, a valve stem, an outlet-release valve, and a pressure-relief valve;
a gas-diffusion chamber, stored within said housing and removable, equipped with an inlet valve and a pressure-relief valve,
wherein said controller means will set off an alarm if said relief valve's spring pressure setting is set above a pre-determined value, and
wherein said gas-diffusion chamber contains an effective amount of purified water user-determined, obtained by a user by manually filling said gas-to a predetermined level with purified water obtained from said common outlet valve for the system;
a gas line used to communicatively couple said at least one $CO_2$ gas cylinder and said gas-diffusion chamber; and
a spring-loaded lever communicatively coupled to said at least one $CO_2$ gas cylinder valve stem such that when said lever is depressed,
said at least one $CO_2$ gas cylinder valve stem opens said outlet-release valve,
said at least one $CO_2$ gas cylinder one-way valve releases pressurized gas into said gas line and into said gas-diffusion chamber via a trachea pipe within said gas-diffusion chamber, and
once said gas-diffusion chamber realizes a saturated content of purified water and $CO_2$ gas (that is, said purified water has become sufficiently carbonated), said outlet-release valve opens, thus signaling a user to release said spring-loaded lever to stop the transfer of gas between said at least one $CO_2$ gas cylinder and said gas-diffusion chamber;
thereby carbonating air-extracted, purified water, which is available for a user to extract via said outlet-release valve.

2. The system of claim 1, wherein said outlet-release valve can direct said purified, carbonated water to said common outlet valve.

3. The system of claim 1, wherein said gas-diffusion chamber has one or more flavorings added to said purified water, prior to carbonization, said flavorings selected from the group consisting of fruit juice, vegetable juice, sugar-based syrups, and extracts from herbs and spices.

4. The system of claim 1, wherein:
said refrigerant compressor is a controllable, variable-speed, high-efficiency compressor;
said refrigerant compressor is controlled by an inverter-controller;
said duty cycles and operation of said refrigerant compressor can be user-adjusted at an onboard control panel via said inverter-controller; and
a user can program the system to operate said refrigerant compressor at optimum efficiency according to the environmental conditions.

5. The system of claim 4, wherein the system is electrically powered by at least one solar panel having a rated capacity of at least 300 W.

6. A method for making a system for providing drinkable sparkling water created from purified potable water derived from the atmosphere and infused with $CO_2$ gas, said system comprising the steps of:
providing a housing having an air-inlet port and an air-exhaust port;
providing a refrigerant compressor;
providing at least one multi-way solenoid-operated refrigerant control valve;
providing a controller means for monitoring for controlling said at least one solenoid-operated refrigerant control valve and other electrical subsystems within the system;
providing an evaporator means,
   wherein said evaporator means has fins for maximizing surface-area contact and heat transfer with ambient air,
   wherein said fins are coated with non-toxic, anti-corrosion materials that comply with applicable regulatory food standards for paint or a PTFE protective layer, said coating also promoting the rapid collection of condensate water, and
   wherein said evaporator can be configured by said at least one solenoid-operated refrigerant control valve to receive chilled refrigerant as pumped from said refrigerant compressor to chill air passing across said evaporator fins, and
   wherein said evaporator can be configured by said at least one solenoid-operated refrigerant control valve to receive hot refrigerant as pumped from said refrigerant compressor to defrost said evaporator fins;
providing an anti-static, anti-mold air filter,
   wherein said anti-static, anti-mold air filter is installed upstream of said evaporator means;
providing a condenser means for the system's refrigeration cycle;
providing a fan/blower means,
   wherein said fan or blower means circulates ambient air from said air-inlet port, through said anti-static, anti-mold air filter, across said evaporator means, said condenser means, then out said air-exhaust port;
providing a collector means with highly polished surfaces;
providing a preliminary filter to remove the smell of condensate water and ammonia,
   wherein said preliminary filter is comprised of activated carbon or zeolite;
providing a condensate-collection tank,
   wherein said highly polished surfaces of said collector means facilitate the gravity flow of condensate water into said condensate-collection tank, and
   wherein said condensate-collection tank is equipped with a water-level detector, said water-level detector and controller means causing said evaporator means to stop receiving chilled refrigerant at a predetermined high-level setpoint;
providing at least one water pump;
providing a particle filter for filtering particles to protect the intake of said at least one water pump;
providing a water-purification filtration assembly to filter out bacteria, viruses, and heavy metals, as well as to remove unwanted smells, comprising:
   at least one activated carbon filter,
   at least one reverse-osmosis filter,
      wherein said reverse-osmosis filter has an aperture of less than or equal to 0.0001 μm, and
      wherein said reverse-osmosis filter can be back-flushed such that the waste water can be directed to said collector means via a three-way valve that is controlled by a waste-water proportion controller,
   at least one zeolite filter;
wherein said water pump pumps condensate water from said condensate-collection tank through said water-purification assembly;
providing a purified-water-collection tank for collecting purified water,
   wherein said purified-water collection tank is equipped with a water-level detector, said water-level detector and controller means causing said at least one water pump to stop pumping new purified water into said purified-water tank at a predetermined high-level setpoint;
providing a cooling loop disposed within said purified-water-collection tank,
   wherein said cooling loop can be configured by said at least one solenoid-operated refrigerant control valve receive refrigerant as pumped from said refrigerant compressor to cool said purified water, and
   wherein the temperature of said purified water in the purified-water-collection tank is maintained within a temperature range of 2-15° C.;
providing a sterilization means for killing biological material and viruses within said purified-water-collection tank, comprising an ultra-violet light device and sterilization chamber, said ultra-violet light device having an effective sterilization rate of at least 99.99%, using a wavelength in the range of 253-255 nm;
providing a hot-water tank that receives purified water from said purified-water tank through gravity drain,
   wherein said hot-water tank contains an electrical heating element,
   wherein the water within said hot-water tank is within a range of 50-95° C., as controlled by said controller means, and
   wherein to provide hot, potable water for a user, said hot, potable water can be pumped by a hot-water pump through an electrically operated valve and an output filter to a common outlet header;
providing a common outlet valve, disposed at said common outlet header, that can be positioned to allow a user to obtain an output of hot or cold purified water from the system;

providing at least one CO₂ gas cylinder, stored within said housing and removable, equipped with a one-way valve, a valve stem, an outlet-release valve, and a pressure-relief valve;

providing a gas-diffusion chamber, stored within said housing and removable, equipped with an inlet valve and a pressure-relief valve, wherein said controller means will set off an alarm if said relief valve's spring pressure setting is set above a pre-determined value, and wherein said gas-diffusion chamber contains an effective amount of purified water user-determined, obtained by a user by manually filling said gas-to a predetermined level with purified water obtained from said common outlet valve for the system;

providing a gas line used to communicatively couple said at least one CO₂ gas cylinder and said gas-diffusion chamber; and a spring-loaded lever communicatively coupled to said at least one CO₂ gas cylinder valve stem such that when said lever is depressed, said at least one CO₂ gas cylinder valve stem opens said outlet-release valve, said at least one CO₂ gas cylinder one-way valve releases pressurized gas into said gas line and into said gas-diffusion chamber via a trachea pipe within said gas-diffusion chamber, and once said gas-diffusion chamber realizes a saturated content of purified water and CO₂ gas (that is, said purified water has become sufficiently carbonated), said outlet-release valve opens, thus signaling a user to release said spring-loaded lever to stop the transfer of gas between said at least one CO₂ gas cylinder and said gas-diffusion chamber;

thereby carbonating air-extracted, purified water, which is available for a user to extract via said outlet-release valve.

7. The method of claim 6, wherein said outlet-release valve can direct said purified, carbonated water to said common outlet valve.

8. The method of claim 6, wherein said gas-diffusion chamber has one or more flavorings added to said purified water, prior to carbonization, said flavorings selected from the group consisting of fruit juice, vegetable juice, sugar-based syrups, and extracts from herbs and spices.

9. The method of claim 6, wherein:

said refrigerant compressor is a controllable, variable-speed, high-efficiency compressor;

said refrigerant compressor is controlled by an inverter-controller;

said duty cycles and operation of said refrigerant compressor can be user-adjusted at an onboard control panel via said inverter-controller; and a user can program the system to operate said refrigerant compressor at optimum efficiency according to the environmental conditions.

10. The method of claim 9, further comprising the step of providing at least one solar panel having a rated capacity of at least 300 W to electrically power the system.

11. A method of making a sparkling beverage, the steps comprising:

obtaining a system for providing drinkable sparkling water according to claim 1;

uncoupling the gas-diffusion chamber from said system housing;

filling said gas-diffusion chamber with purified water to a predetermined level via said system's common outlet valve;

recoupling said gas-diffusion chamber into said system housing;

actuating said lever communicatively coupled to said at least one CO₂ gas cylinder valve stem, wherein when said at least one CO₂ gas cylinder valve opens, wherein said at least one CO₂ gas cylinder one-way valve releases pressurized gas into said gas line and into said gas-diffusion chamber via a trachea pipe within said gas-diffusion chamber, and wherein once said gas-diffusion chamber realizes a saturated content of purified water and CO₂ gas (that is, said purified water has become sufficiently carbonated), said outlet-release valve opens, thus signaling a user to release said spring-loaded lever to stop the transfer of gas between said at least one CO₂ gas cylinder and said gas-diffusion chamber;

when said gas-diffusion chamber release valve provides audible signal that saturation has been reached within said gas-diffusion chamber, then releasing said level, allowing it to return to its original position and allowing the flow of gas from said at least one CO₂ gas cylinder to said gas-diffusion chamber to stop;

obtaining purified, sparking water from the outlet of said gas-diffusion chamber release valve, depositing said purified, sparkling water into a container of the user's choice.

12. The method of claim 11, further comprising the step of, just prior to or just after the step of filling said gas-diffusion chamber with purified water to a predetermined level via said system's common outlet valve, adding one or more flavorings to said gas-diffusion chamber, wherein said flavorings selected from the group consisting of fruit juice, vegetable juice, sugar-based syrups, and extracts from herbs and spices.

13. The method of claim 11, wherein:

said obtained system's refrigerant compressor is a controllable, variable-speed, high-efficiency compressor;

said obtained system's refrigerant compressor is controlled by an inverter-controller;

said duty cycles and operation of said obtained system's refrigerant compressor can be user-adjusted at an onboard control panel via said inverter-controller; and a user can program said obtained system to operate said obtained system's refrigerant compressor at optimum efficiency according to the environmental conditions.

14. The method of claim 13, wherein said obtained system further comprises at least one solar panel having a rated capacity of at least 300 W to electrically power said obtained system.

\* \* \* \* \*